United States Patent
Cochran et al.

(10) Patent No.: US 11,068,037 B2
(45) Date of Patent: Jul. 20, 2021

(54) DEVICE HAVING MAIN AND BACKUP POWER

(71) Applicant: HEWLETT PACKARD ENTERPRISE DEVELOPMENT LP, Houston, TX (US)

(72) Inventors: Charles W. Cochran, Houston, TX (US); David P. Mohr, Houston, TX (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 76 days.

(21) Appl. No.: 16/072,015

(22) PCT Filed: Jan. 21, 2016

(86) PCT No.: PCT/US2016/014353
§ 371 (c)(1),
(2) Date: Jul. 23, 2018

(87) PCT Pub. No.: WO2017/127088
PCT Pub. Date: Jul. 27, 2017

(65) Prior Publication Data
US 2019/0033942 A1     Jan. 31, 2019

(51) Int. Cl.
*G06F 1/26*     (2006.01)
*G06F 1/30*     (2006.01)
(Continued)

(52) U.S. Cl.
CPC ............. *G06F 1/30* (2013.01); *G06F 1/263* (2013.01); *G06F 1/28* (2013.01); *H02J 9/061* (2013.01); *H02J 1/082* (2020.01)

(58) Field of Classification Search
CPC ..... G06F 1/32; G06F 1/26; G06F 1/00; G06F 9/44
See application file for complete search history.

(56) References Cited

U.S. PATENT DOCUMENTS 4,697,858 A * 10/1987 Balakrishnan ........... H05K 1/14
439/61
4,860,185 A * 8/1989 Brewer ..................... G06F 1/28
363/41
(Continued)

FOREIGN PATENT DOCUMENTS

JP     2008167509 A     7/2008
KR     1020090085973 A     8/2009

OTHER PUBLICATIONS

International Search Report and Written Opinion, International Application No. PCT/US2016/014353, dated Oct. 12, 2016, pp. 1-9, KIPO.

(Continued)

*Primary Examiner* — Keshab R Pandey
(74) *Attorney, Agent, or Firm* — Dicke, Billig & Czaja, PLLC

(57) ABSTRACT

One example of a device includes a low voltage direct current (LVDC) bus and a high voltage direct current (HVDC) to LVDC converter to receive HVDC power from an enclosure and provide main LVDC power. The device includes a circuit to pass the main LVDC power to the LVDC bus while the main LVDC power is within regulation limits and to pass backup LVDC power from the enclosure to the LVDC bus in response to the main LVDC power falling outside the regulation limits.

20 Claims, 5 Drawing Sheets

(51) Int. Cl.
*G06F 1/28* (2006.01)
*H02J 9/06* (2006.01)
*H02J 1/08* (2006.01)

(56) References Cited

U.S. PATENT DOCUMENTS

| | | | |
|---|---|---|---|
| 5,612,581 A | 3/1997 | Kageyama | |
| 6,255,744 B1 | 7/2001 | Shih et al. | |
| 8,606,447 B2 | 12/2013 | Namuduri et al. | |
| 2004/0061380 A1* | 4/2004 | Hann | H02J 1/06 307/43 |
| 2006/0050460 A1 | 3/2006 | Ebata | |
| 2007/0047100 A1* | 3/2007 | Takahashi | H02J 9/061 359/689 |
| 2007/0097569 A1* | 5/2007 | Huang | H02M 1/32 361/56 |
| 2010/0097044 A1* | 4/2010 | Gipson | H02J 1/10 323/285 |
| 2010/0181826 A1* | 7/2010 | Fuller | B60R 16/03 307/9.1 |
| 2010/0289336 A1 | 11/2010 | Sugita | |
| 2011/0018344 A1* | 1/2011 | Liao | G06F 1/28 307/31 |
| 2011/0133559 A1 | 6/2011 | Yamashita et al. | |
| 2011/0192905 A1* | 8/2011 | Powilleit | G06F 1/163 235/462.42 |
| 2012/0134090 A1 | 5/2012 | Peng | |
| 2015/0035367 A1* | 2/2015 | Fang | H02J 9/061 307/64 |
| 2015/0180232 A1* | 6/2015 | Mino | H02J 1/102 307/23 |
| 2016/0164285 A1* | 6/2016 | Elliott | B60L 58/40 307/9.1 |

OTHER PUBLICATIONS

Yaow-Ming Chen et al., "Double-Input PWM DC/DC Converter for High-/Low-Voltage Sources," IEEE Transactions on Industrial Electronics, Oct. 2006, pp. 1538-1545, vol. 53, No. 5, IEEE.

* cited by examiner

DEVICE HAVING MAIN AND BACKUP POWER

BACKGROUND

A plurality of computing devices (e.g., servers), network switches, management modules, power supplies, and cooling devices may be installed within a server enclosure. The power supplies may supply power to the other devices installed within the server enclosure. Alternatively, the server enclosure may receive power from external power supplies and distribute the power to the devices installed within the server enclosure.

DETAILED DESCRIPTION

In the following detailed description, reference is made to the accompanying drawings which form a part hereof, and in which is shown by way of illustration specific examples in which the disclosure may be practiced. It is to be understood that other examples may be utilized and structural or logical changes may be made without departing from the scope of the present disclosure. The following detailed description, therefore, is not to be taken in a limiting sense, and the scope of the present disclosure is defined by the appended claims. It is to be understood that features of the various examples described herein may be combined, in part or whole, with each other, unless specifically noted otherwise.

Figure 1:
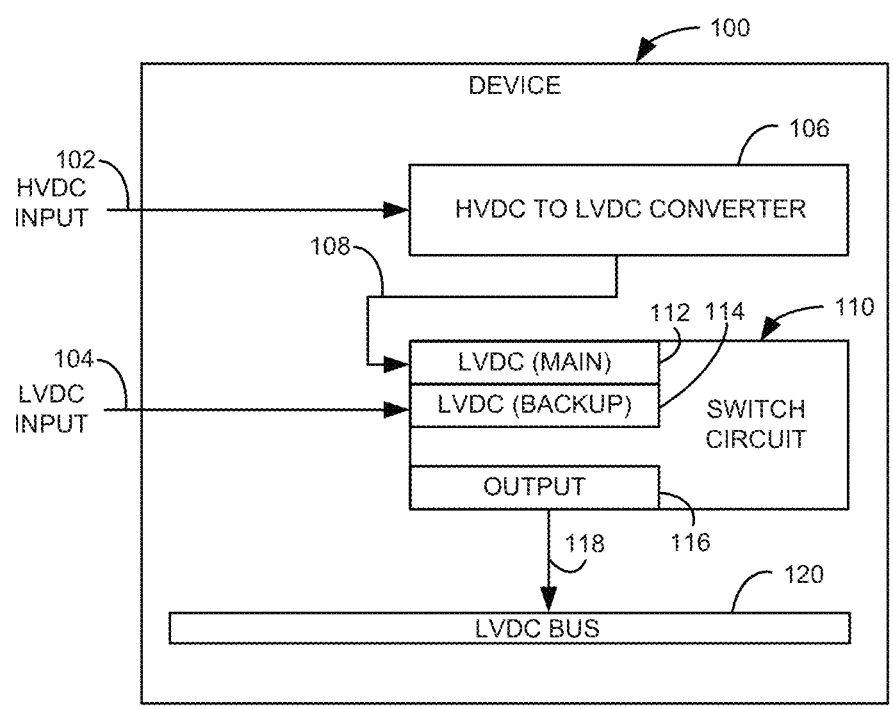
FIG. 1 is a block diagram illustrating one example of a device.

FIG. 1 is a block diagram illustrating one example of a device 100. In one example, device 100 is a server, a network switch, a management module, or another suitable device that may be installed within a server enclosure. Device 100 includes a high voltage direct current (HVDC) input 102, a low voltage direct current (LVDC) input 104, a HVDC to LVDC converter 106, a switch circuit 110, a LVDC bus 120, and circuitry powered by LVDC bus 120 (not shown). Switch circuit 110 includes a main LVDC input 112, a backup LVDC input 114, and an output 116.

HVDC input 102 is electrically coupled to the input of HVDC to LVDC converter 106. The output of HVDC to LVDC converter 106 is electrically coupled to main LVDC input 112 of switch circuit 110 through a power transmission path 108. Backup LVDC input 114 of switch circuit 110 is electrically coupled to LVDC input 104. Output 116 of switch circuit 110 is electrically coupled to LVDC bus 120 through a power transmission path 118.

HVDC input 102 may receive HVDC power from a server enclosure, such as from a HVDC backplane of the server enclosure. LVDC input 104 may receive LVDC power from the server enclosure, such as from a LVDC backplane of the server enclosure. In one example, the HVDC power has a voltage within the range between 360 VDC and 380 VDC, and the LVDC power has a voltage within the range between 12 VDC and 48 VDC. In other examples, the HVDC power and the LVDC power may have other suitable voltages where the voltage of the HVDC power is greater than the voltage of the LVDC power.

HVDC to LVDC converter 106 receives the HVDC power from HVDC input 102 and converts the HVDC power to provide main LVDC power to main LVDC input 112 of switch circuit 110. Backup LVDC input 114 of switch circuit 110 receives the LVDC power from LVDC input 104 as backup LVDC power. Switch circuit 110 selectively passes the main LVDC power and the backup LVDC power to output 116. Output 116 passes the selected LVDC power to LVDC bus 120. LVDC bus 120 powers device 100.

In one example, switch circuit 110 monitors the main LVDC power and passes the main LVDC power to LVDC bus 120 while the main LVDC power is within regulation limits. The regulation limits may define a voltage and current range within which the main LVDC power is suitable for powering device 100. In response to the main LVDC power falling outside the regulation limits, switch circuit 110 passes the backup LVDC power to LVDC bus 120. In another example, switch circuit 110 switches from passing the main LVDC power to LVDC bus 120 to passing the backup LVDC power to LVDC bus 120 in response to a failure of HVDC to LVDC converter 106. In another example, switch circuit 110 switches from passing the main LVDC power to LVDC bus 120 to passing the backup LVDC power to LVDC bus 120 in response to a failure of the HVDC power received at HVDC input 102. Switch circuit 110 may switch from passing the main LVDC power to LVDC bus 120 to passing the backup LVDC power to LVDC bus 120 without interrupting the power provided to device 100 such that device 100 remains operational during the transition from main LVDC power to backup LVDC power. In one example, switch circuit 110 switches from passing the main LVDC power to LVDC bus 120 to passing the backup LVDC power to LVDC bus 120 within 10 milliseconds of a failure of the main LVDC power.

Figure 2:
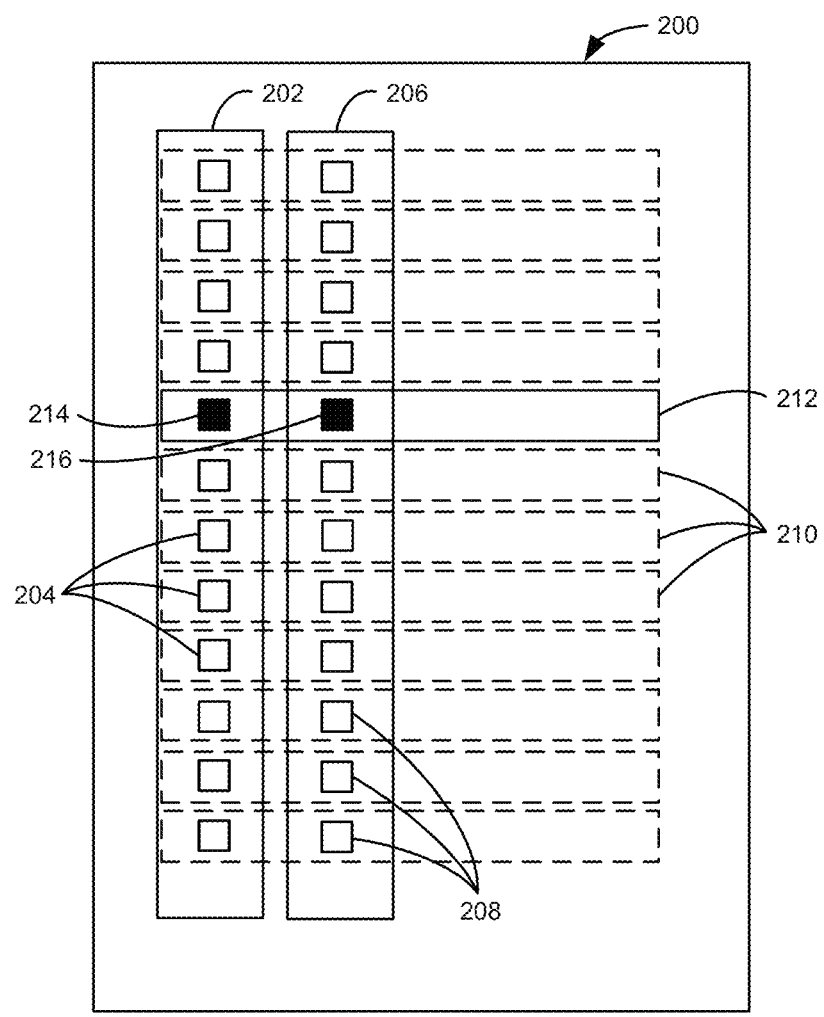
FIG. 2 is a schematic diagram illustrating one example of an enclosure.

FIG. 2 is a schematic diagram illustrating one example of an enclosure 200. In one example, enclosure 200 is a server enclosure within which device 100 previously described and illustrated with reference to FIG. 1 may be installed. Enclosure 200 includes a LVDC backplane 202, a HVDC backplane 206, and a plurality of slots indicated for example at 210 for receiving devices. LVDC backplane 202 includes a plurality of LVDC connectors indicated for example at 204. Each LVDC connector 204 may be electrically coupled to a LVDC input of a device installed in a slot 210 corresponding to the LVDC connector 204. Each LVDC connector 204 is electrically coupled to a power supply (not shown) providing LVDC power to LVDC backplane 202. HVDC backplane 206 includes a plurality of HVDC connectors indicated for example at 208. Each HVDC connector 208 may be electrically coupled to a HVDC input of a device installed in a slot 210 corresponding to the HVDC connector 208. Each HVDC connector 208 is electrically coupled to a power supply (not shown) providing HVDC power to HVDC backplane 206.

A device installed in a slot 210 may be powered by LVDC backplane 202 or HVDC backplane 206. For example, a higher power device (e.g., liquid cooled server) may be powered by HVDC backplane 206 while a lower power device (e.g., network switch, air cooled server) may be powered by LVDC backplane 202. A device installed in a slot 210 may also be electrically coupled to both LVDC backplane 202 and HVDC backplane 206. In this case, LVDC backplane 202 provides backup power in the event of a failure of the power supply powering HVDC backplane 206 or the failure of the HVDC to LVDC converter within the device.

In this example, a device 212 is installed in a slot 210. In one example, device 212 may be device 100 previously described and illustrated with reference to FIG. 1. Device 212 includes a LVDC input electrically coupled to a LVDC connector 204 of LVDC backplane 202 as indicated at 214. Device 212 also includes a HVDC input electrically coupled to a HVDC connector 208 of HVDC backplane 206 as indicated at 216. Device 212 receives HVDC power from HVDC backplane 206 and converts the HVDC power to provide main LVDC power for the device. Device 212 also receives LVDC power from LVDC backplane 202, which provides backup LVDC power. Device 212 operates using the main LVDC power while the main LVDC power is within regulation limits. Device 212 operates using the backup LVDC power in response to the main LVDC power falling outside the regulation limits.

FIGS. 3A-3D are schematic diagrams illustrating examples of a switch circuit, such as switch circuit 110 previously described and illustrated with reference to FIG. 1. While four example switch circuits are illustrated and described below, other suitable switch circuits providing the switching function previously described with reference to switch circuit 110 may be used.

Figure 3A:
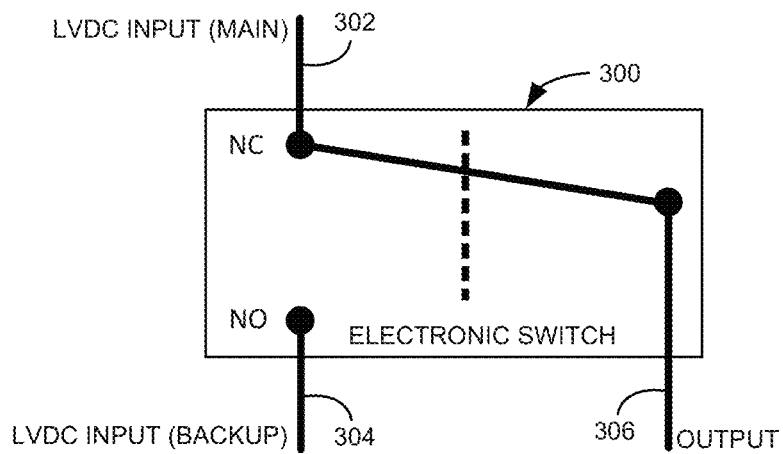
FIGS. 3A-3D are schematic diagrams illustrating examples of a switch circuit.

FIG. 3A is a schematic diagram illustrating one example of a switch circuit 300. Switch circuit 300 is an electronic switch including a main LVDC input 302, a backup LVDC input 304, and an output 306. Main LVDC input 302 is electrically coupled to a normally closed (NC) terminal of electronic switch 300. Backup LVDC input 304 is electrically coupled to a normally open (NO) terminal of electronic switch 300. Electronic switch 300 electrically couples the NC terminal to output 306 (as illustrated) when main LVDC power is detected at main LVDC input 302 to pass the main LVDC power to output 306. Electronic switch 300 electrically couples the NO terminal to output 306 when main LVDC power is not detected at main LVDC input 302 to pass the backup LVDC power to output 306.

Figure 3B:
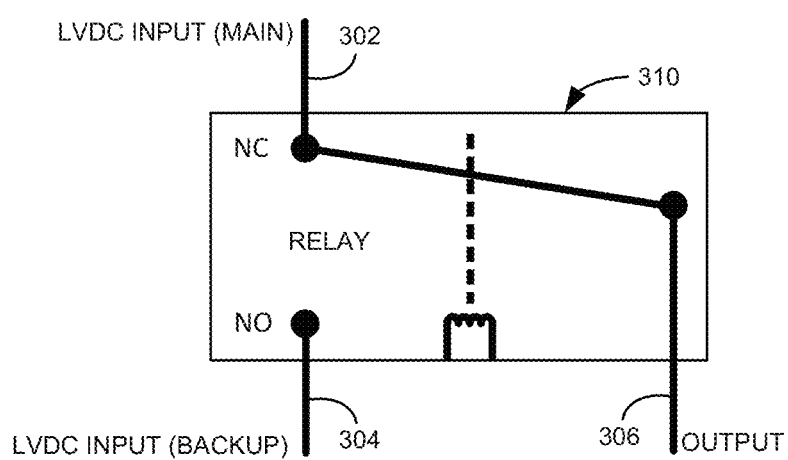

FIG. 3B is a schematic diagram illustrating another example of a switch circuit 310. Switch circuit 310 is a relay including a main LVDC input 302, a backup LVDC input 304, and an output 306. Main LVDC input 302 is electrically coupled to a normally closed (NC) terminal of relay 310. Backup LVDC input 304 is electrically coupled to a normally open (NO) terminal of relay 310. Relay 310 electrically couples the NC terminal to output 306 (as illustrated) when main LVDC power is detected at main LVDC input 302 to pass the main LVDC power to output 306. Relay 310 electrically couples the NO terminal to output 306 when main LVDC power is not detected at main LVDC input 302 to pass the backup LVDC power to output 306.

Figure 3C:
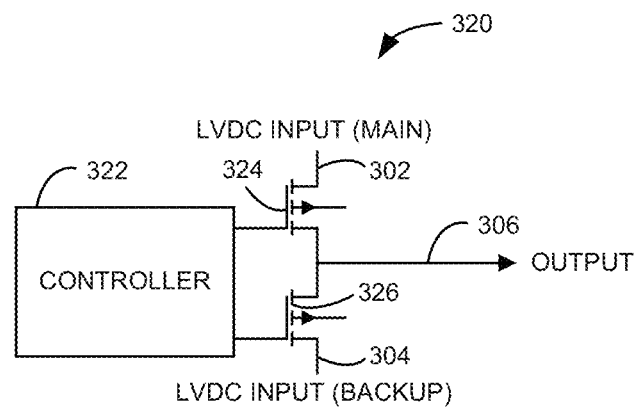

FIG. 3C is a schematic diagram illustrating another example of a switch circuit 320. Switch circuit 320 includes a main LVDC input 302, a backup LVDC input 304, an output 306, a controller 322, a first transistor 324, and a second transistor 326. Main LVDC input 302 is electrically coupled to one side of the source-drain path of first transistor 324. Backup LVDC input 304 is electrically coupled to one side of the source-drain path of second transistor 326. The other side of the source-drain path of first transistor 324 and the other side of the source-drain path of second transistor 326 are electrically coupled to output 306. The gate of first transistor 324 and the gate of second transistor 326 are electrically coupled to controller 322. Controller 322 may monitor the main LVDC power. Controller 322 turns on first transistor 324 and turns off second transistor 326 to pass the main LVDC power to output 306 when the main LVDC power is within regulation limits. Controller 322 turns off first transistor 324 and turns on second transistor 326 to pass the backup LVDC power to output 306 in response to the main LVDC power falling outside the regulation limits.

Figure 3D:
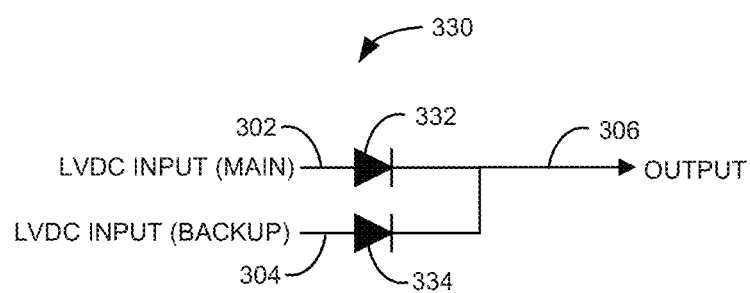

FIG. 3D is a schematic diagram illustrating another example of a switch circuit 330. Switch circuit 330 includes a main LVDC input 302, a backup LVDC input 304, an output 306, a first diode 332, and a second diode 334. Main LVDC input 302 is electrically coupled to the anode of first diode 332. Backup LVDC input 304 is electrically coupled to the anode of second diode 334. The cathode of first diode 332 and the cathode of second diode 334 are electrically coupled to output 306. Both first diode 332 and second diode 334 pass LVDC power to output 306 when main LVDC power is present at main LVDC input 302. Second diode 334 passes backup LVDC power to output 306 when main LVDC power is not preset at main LVDC input 302.

Figure 4:
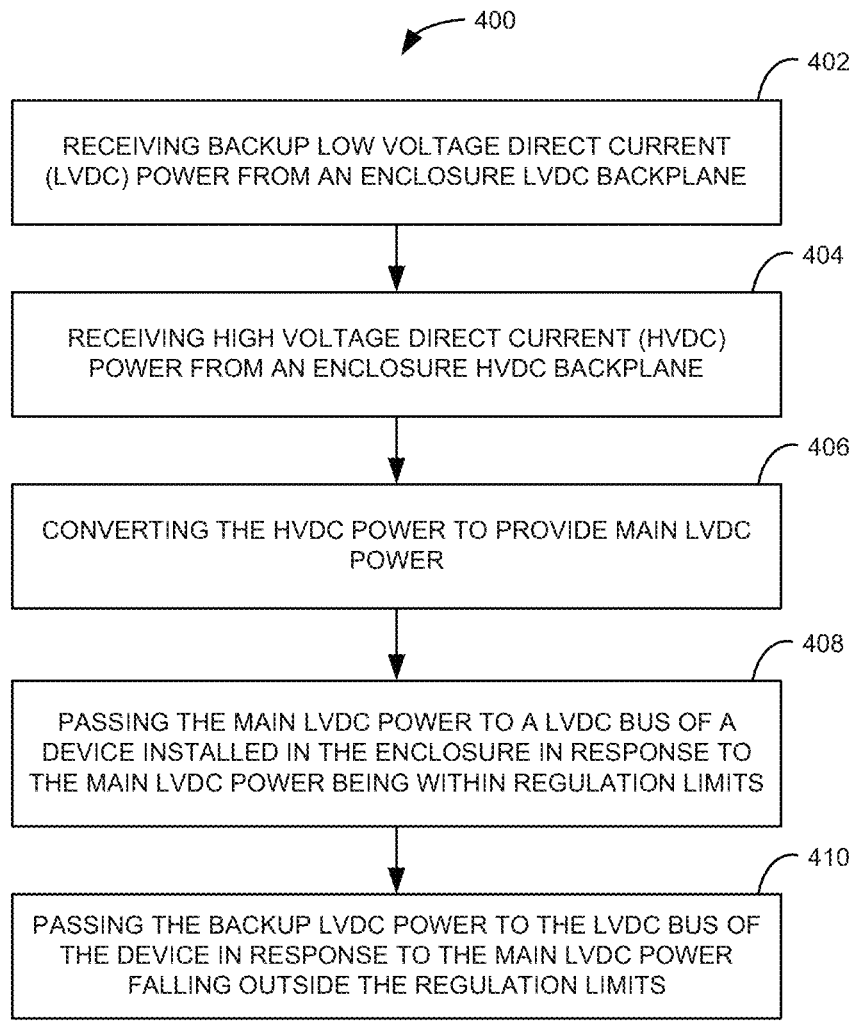
FIG. 4 is a flow diagram illustrating one example of a method for operating a device.

FIG. 4 is a flow diagram illustrating one example of a method 400 for operating a device, such as device 100 previously described and illustrated with reference to FIG. 1. At 402, method 400 includes receiving backup LVDC power from an enclosure LVDC backplane. In one example, receiving the backup LVDC power from the enclosure LVDC backplane comprises receiving 12 VDC from the enclosure LVDC backplane. At 404, method 400 includes receiving HVDC power from an enclosure HVDC backplane. In one example, receiving the HVDC power from the enclosure HVDC backplane comprises receiving 380 VDC from the enclosure HVDC backplane. At 406, method 400 includes converting the HVDC power to provide main LVDC power. In one example, converting the HVDC power to provide main LVDC power comprises converting 380 VDC to 12 VDC. At 408, method 400 includes passing the main LVDC power to a LVDC bus of a device installed in the enclosure in response to the main LVDC power being within regulation limits. At 410, method 400 includes passing the backup LVDC power to the LVDC bus of the device in response to the main LVDC power falling outside the regulation limits.

Although specific examples have been illustrated and described herein, a variety of alternate and/or equivalent implementations may be substituted for the specific examples shown and described without departing from the scope of the present disclosure. This application is intended to cover any adaptations or variations of the specific examples discussed herein. Therefore, it is intended that this disclosure be limited only by the claims and the equivalents thereof.

The invention claimed is:

1. A device for installation in an enclosure, the enclosure having a plurality of slots to receive insertion of a plurality of devices into respective slots of the plurality of slots, a high voltage direct current (HVDC) backplane to provide a first power source to each of the plurality of slots, and a low voltage direct current (LVDC) backplane to provide a second power source to each of the plurality of slots, the device to receive operational power, after insertion, from each of the first and second power source that are external to the device, the device comprising:
    an internal LVDC bus;
    a HVDC input to connect, upon insertion, to the first power source from a first slot of the enclosure that received insertion of the device;
    a LVDC input to connect, upon insertion, to the second power source from the first slot of the enclosure, the first power source and the second power source to independently provide power to the device;
a HVDC to LVDC converter electrically connected to the HVDC input to receive HVDC power from the HVDC input and provide main LVDC power; and
a circuit electrically connected to the HVDC to LVDC converter and to the LVDC input, the circuit to pass in operation the main LVDC power from the HVDC to LVDC converter to the LVDC bus while the main LVDC power is within regulation limits and to pass backup LVDC power from the LVDC input to the LVDC bus in response to the main LVDC power falling outside the regulation limits.

2. The device of claim 1, wherein the circuit comprises an electronic switch to pass the main LVDC power to the LVDC bus while the main LVDC power is within regulation limits and to pass the backup LVDC power to the LVDC bus in response to the main LVDC power falling outside the regulation limits.

3. The device of claim 1, wherein the circuit comprises a first transistor to pass the main LVDC power to the LVDC bus while the main LVDC power is within regulation limits and a second transistor to pass the backup LVDC power to the LVDC bus in response to the main LVDC power falling outside the regulation limits.

4. The device of claim 1, wherein the circuit comprises a first diode to pass the main LVDC power to the LVDC bus and a second diode to pass the backup LVDC power to the LVDC bus.

5. The device of claim 1, wherein the circuit switches from passing the main LVDC power to the LVDC bus to passing the backup LVDC power to the LVDC bus without interruption.

6. The device of claim 1, wherein the circuit switches from passing the main LVDC power to the LVDC bus to passing the backup LVDC power to the LVDC bus in response to a failure of the HVDC to LVDC converter.

7. The device of claim 1, wherein the circuit switches from passing the main LVDC power to the LVDC bus to passing the backup LVDC power to the LVDC bus in response to a failure of the first power source.

8. A system comprising:
an enclosure comprising:
    a plurality of slots to receive insertion of a plurality of devices into a respective one of the plurality of slots;
    a high voltage direct current (HVDC) backplane providing a first power source to each of the plurality of slots; and
    a low voltage direct current (LVDC) backplane providing a second power source to each of the plurality of slots; and
a first device, from the plurality of devices, inserted into a first of the plurality of slots of the enclosure, the device to receive operational power, after insertion, via a HVDC input and a LVDC input, the device electrically coupled to the HVDC backplane via the HVDC input and to the LVDC backplane via the LVDC input, the device further comprising:
    a HVDC to LVDC converter to convert HVDC power from the HVDC input to provide main LVDC power;
    a LVDC bus; and
    a circuit to selectively pass the main LVDC power to the LVDC bus and backup LVDC power from the LVDC input to the LVDC bus.

9. The system of claim 8, wherein the circuit passes the backup LVDC power in response to a failure of the HVDC to LVDC converter.

10. The system of claim 8, wherein the circuit passes the backup LVDC power in response to a failure of receiving power from the HVDC input.

11. The system of claim 8, wherein the circuit switches from passing the main LVDC power to the LVDC bus to passing the backup LVDC power to the LVDC bus within 10 milliseconds of a failure of the main LVDC power.

12. A method comprising:
providing a low voltage direct current (LVDC) backplane and a high voltage direct current (HVDC) backplane concurrently and independently to each of a plurality of slots of an enclosure;
receiving backup LVDC power from the LVDC backplane at an LVDC input of a device installed in a first of the plurality of slots of the enclosure;
receiving HVDC power from the HVDC backplane at a HVDC input of the device;
converting the HVDC power to provide main LVDC power using a HVDC to LVDC converter of the device;
passing the main LVDC power to a LVDC bus of a the device in response to the main LVDC power being within regulation limits; and
passing the backup LVDC power to the LVDC bus of the device in response to the main LVDC power falling outside the regulation limits,
wherein the device receives operational power, after insertion, from each of the HVDC backplane and the LVDC backplane that are external to the device.

13. The method of claim 12, wherein receiving the HVDC power from the HVDC backplane comprises receiving 380 VDC from the HVDC backplane.

14. The method of claim 12, wherein receiving the backup LVDC power from the LVDC backplane comprises receiving 12 VDC from the LVDC backplane.

15. The method of claim 12, wherein converting the HVDC power to provide main LVDC power comprises converting 380 VDC to 12 VDC.

16. The system of claim 8, wherein the circuit comprises an electronic switch to pass the main LVDC power to the LVDC bus while the main LVDC power is within regulation limits and to pass the backup LVDC power to the LVDC bus in response to the main LVDC power falling outside the regulation limits.

17. The system of claim 8, wherein the circuit comprises a first transistor to pass the main LVDC power to the LVDC bus while the main LVDC power is within regulation limits and a second transistor to pass the backup LVDC power to the LVDC bus in response to the main LVDC power falling outside the regulation limits.

18. The system of claim 8, wherein the circuit comprises a first diode to pass the main LVDC power to the LVDC bus and a second diode to pass the backup LVDC power to the LVDC bus.

19. The system of claim 8, wherein the circuit switches from passing the main LVDC power to the LVDC bus to passing the backup LVDC power to the LVDC bus in response to a failure of the HVDC to LVDC converter.

20. The system of claim 8, wherein the HVDC to LVDC converter converts 380 VDC to 12 VDC.

* * * * *